United States Patent [19]

Radford et al.

[11] Patent Number: 5,155,666
[45] Date of Patent: Oct. 13, 1992

[54] LIGHT BEACON FOR MARKING TALL OBSTRUCTIONS

[75] Inventors: Ray A. Radford, Andover; Robert A. Capobianco, Reabody, both of Mass.

[73] Assignee: EG&G, Inc., Salem, Mass.

[21] Appl. No.: 631,401

[22] Filed: Dec. 21, 1990

[51] Int. Cl.$^5$ .............................................. F21Q 3/00
[52] U.S. Cl. .................... 362/145; 362/241; 362/252
[58] Field of Search ............... 362/363, 237, 240, 241, 362/252, 431, 62, 187, 145, 238, 277, 285, 249

[56] References Cited

U.S. PATENT DOCUMENTS

| | | | |
|---|---|---|---|
| 1,325,155 | 12/1919 | Kaczmaryk | 362/241 |
| 1,930,085 | 10/1933 | Fehse . | |
| 1,961,116 | 5/1934 | van Braam van Vloten . | |
| 2,255,433 | 9/1941 | Moss | 362/240 |
| 2,273,747 | 2/1942 | Adler, Jr. | 362/62 |
| 2,332,383 | 10/1943 | Kost . | |
| 2,584,292 | 2/1952 | Rogers | 362/240 |
| 2,605,384 | 7/1952 | Adler, Jr. | 362/240 |
| 2,639,366 | 5/1953 | Cline . | |
| 3,031,645 | 4/1962 | Koontz | 362/62 |
| 3,311,743 | 3/1967 | Moore | 362/241 |
| 4,942,505 | 7/1990 | Maglica | 362/187 |
| 4,984,142 | 1/1991 | Garnerone | 362/240 |

OTHER PUBLICATIONS

Advisory Circular No. 150/5345-43, U.S. Department of Transportation, Federal Aviation Administration, Jul. 15, 1988.

*Primary Examiner*—Richard R. Cole
*Attorney, Agent, or Firm*—Finnegan, Henderson, Farabow, Garrett & Dunner

[57] ABSTRACT

A light beacon for marking tall obstructions which may present a navigational hazard to air traffic comprises a transparent cover and a plurality of linear light sources, each having a central axis. The linear light sources are positioned within the transparent cover in a substantially horizontal orientation relative to a reference plane which will typically be parallel to the horizon. The plurality of reflectors corresponding to the plurality of linear light sources are positioned behind respective ones of the light sources. Each of the reflectors has an optically reflective surface and is configured as a partial cylinder having a parabolic or pseudo-parabolic cross-section. The reflective surface having the parabolic or pseudo-parabolic cross-section defines an optical center comprised of a focal line. The linear light source is disposed with its central axis being substantially coincident with the focal line or optical center of the respective reflectors. When three or more of the linear light sources and corresponding optical reflectors are disposed at equal angles relative to each adjacent pair of optical reflector and linear light source, a composite beam may be generated having a substantially uniform intensity over an arc of up to 360°.

26 Claims, 8 Drawing Sheets

LIGHT BEACON FOR MARKING TALL OBSTRUCTIONS

BACKGROUND OF THE INVENTION

1. Field of the Invention

The present invention relates to light beacons and, more specifically, to light beacons for mounting on the apex of tall obstructions which present a hazard to air traffic.

2. Description of the Related Art

Light beacons for marking navigational hazards have been known and used for some time. Light beacons used to mark and identify tall obstructions which may present hazards to air traffic are required to meet certain specifications as developed by the Federal Aviation Administration and as spelled out in FAA Advisory Circular 150/5345-43. These specifications require that such light beacons be capable of generating a 360° light beam in a horizontal plane while also meeting peak photometric light intensity and beam spread dimensions for both the vertical and horizontal planes.

To the inventors' knowledge, all qualified suppliers of light beacons meeting the above-mentioned FAA specification utilize either a 250 mm or 300 mm acrylic Fresnel lens cover with either a vertically or horizontally mounted helical flash lamp. Such known beacons are typically powered by an electrical power supply located at the base of the tall structure on which the beacon is mounted.

However, Fresnel lenses of the known light beacons are more efficiently used with a filament-type or point-type light source. With other types of light sources, such as a helical lamp, the efficiency of the Fresnel lens is reduced. Due to the FAA light output requirements for these types of beacons, the helical flash lamp must be made considerably larger in output than a point source type of light and results in reduced efficiency of the Fresnel lens. Furthermore, while the FAA requirements specify a vertical beam pattern having a 3° arc minimum, it specifies that the lower edge of the vertical beam spread must lie between 1.5° and 0.5° below the horizontal. In order to meet this requirement the known beacon obstruction lights position the helical lamp within the lens cover in a position which lowers the efficient use of the output illumination.

Furthermore, the beacon obstruction lights utilizing a Fresnel lens cover are not easily adapted to vary the intensity or spread of the beam generated so as to accommodate varying land contours where the obstruction might be situated. Also, such known obstruction beacon lights produce a simple beam pattern and are not easily adapted to produce composite beam patterns for particular applications.

Still further, the helical flash lamps in these known beacons are typically mounted on one end to stand upright and therefore require a relatively large Fresnel lens cover. Obviously, a larger lens cover results in increased wind loading when the beacon is mounted on the obstruction and is more expensive to manufacture than would be smaller covers.

SUMMARY OF THE INVENTION

Accordingly, it is an object of the present invention to provide a beacon obstruction light which meets all of the presently existing FAA requirements and is therefore capable of generating a light beam having an arc of up to 360°, and where conditions require, less than 360°.

It is a further object of the present invention to provide an obstruction lighting beacon which is capable of producing a large number of composite beam patterns which may be adapted to the specific application of the beacon.

A further object of the present invention is to provide an obstruction lighting beacon wherein the vertical spread of the beam generated by the beacon is easily adjustable.

Another object of the present invention is to provide an obstruction lighting beacon which is easily adapted to produce different color light for daytime and nighttime use.

A further object of the present invention is to provide an obstruction lighting beacon which is smaller and less expensive to manufacture than known beacons and which is particularly well adapted to produce a sequenced or coded beacon signal to thereby uniquely identify the particular obstruction to which the beacon is mounted.

To achieve the foregoing objects, and in accordance with purposes of the invention as embodied and broadly described herein, a light beacon is provided comprising a transparent cover, a plurality of linear light sources, and means for positioning the linear light sources within the transparent cover in a substantially horizontal orientation relative to a reference plane. The reference plane will typically be parallel to the horizon. A plurality of reflectors corresponding to the plurality of linear light sources is also provided with each reflector having an optically reflective surface. The reflectors are mounted within the beacon such that each light source is positioned between the reflective surface of a corresponding reflector and the transparent cover so as to direct reflected light outwardly from the beacon. The linear light sources and the reflectors are disposed relative to one another so as to generate a light beam having substantially uniform intensity over an arc of up to 360°.

In a preferred embodiment, the reflectors are formed as a partial cylinder having a parabolic cross-section and the optically reflective surface of the reflector is formed on the concave side of the parabolic reflector. The linear light source is disposed substantially parallel to the parabolically shaped reflective surface and substantially coincident with the optical center of the particular reflector. Alternatively, the reflectors may have a pseudo-parabolic cross-section formed from a composite of numerous, separately and partially defined parabolic sections. The reflective surface may also be aspheric or even spherical so as to generate a light beam having a particular configuration.

It is still further preferable that the light beacon include a power supply means for activating the light sources to produce H, TM light, and means for controlling the power supply means to selectively activate all or respective ones of the light sources in a selected sequence. In this manner, the light beacon can be controlled to produce a definitive sequence or pattern of flashes so as to uniquely identify the obstruction to which it is mounted.

In a preferred embodiment of the present invention, the linear light sources and reflectors comprise three corresponding pairs of light sources and reflectors disposed at about 120° angles relative to one another to thereby form a light beam having a substantially uniform intensity over an entire 360° arc when all of the light sources are activated to generate light.

It is still further preferable that the light beacon include means for adjusting the orientation of the reflectors relative to the reference plane so as to adjust the shape of the light beam generated. In the preferred embodiment, the light beacon includes a plurality of set screws for adjusting the orientation of the reflectors relative to the reference plane. Alternatively, the reflectors may be pivotably mounted so as to be adjustable relative to the reference plane.

BRIEF DESCRIPTION OF THE DRAWINGS

The accompanying drawings, which are incorporated in and constitute a part of the specification, illustrate presently preferred embodiments of the invention and, together with the general description given above and the detailed description given below, serve to explain the principals of the invention. In the drawings.

DESCRIPTION OF THE PREFERRED EMBODIMENTS

Figure 1:
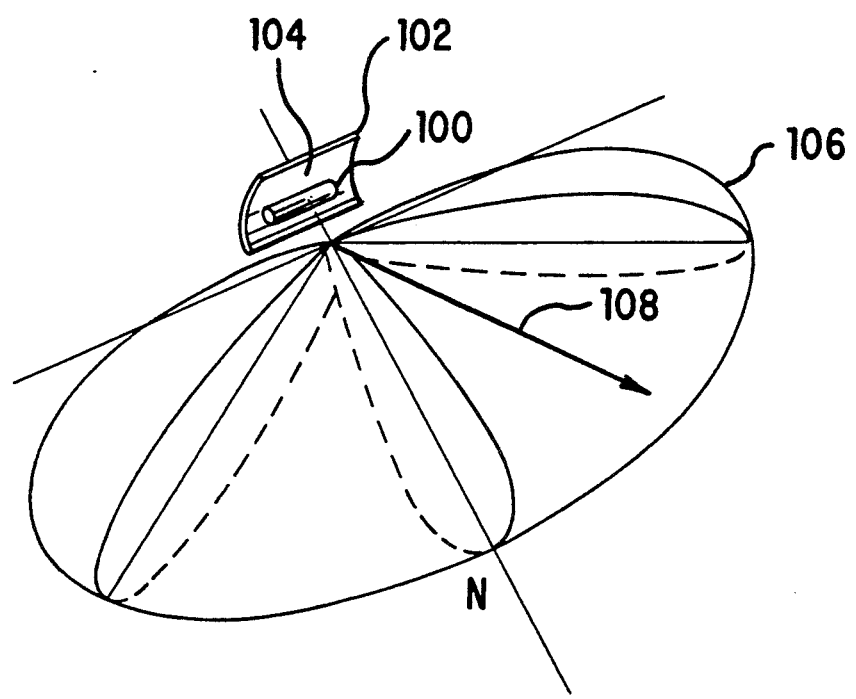
FIG. 1 illustrates the general form of a light beam pattern which is generated with a parabolic reflector centered behind a linear light source.

Reference will now be made in detail to the present preferred embodiments of the invention as illustrated in the accompanying drawings, in which like reference characters designate like or corresponding parts throughout the several drawings.

Prior to discussing the specific configuration of the preferred embodiments addressed herein, it is helpful to discuss more generally the types and configurations of light beam patterns, commonly referred to as lobes, generated through use of a combination light source and parabolically shaped reflector. With reference to FIG. 1, a linear light source 100 which may, for example, comprise a xenon filled flash tube, is disposed at the optical center of a parabolically shaped cylindrical reflector 102 having an optically reflective surface 104 formed on the concave side of the reflector. In this instance, the optical center of the reflector comprises a focal line and the central axis of flash tube 100 is positioned substantially coincident with the focal line. Within the scope of the present invention, the reflector may take the form of a pseudo-parabolic configuration which is either aspheric, elliptic, spheric, or some combination of these configurations to form a complex reflective surface. With the parabolically shaped reflector 104, a light beam pattern or lobe 106 is generated as a result of the illumination generated by light source 100 reflecting from optically reflective surface 104. Vector 108 indicates the intensity and the angle of the light beam at any given point on lobe 106.

Figure 2:
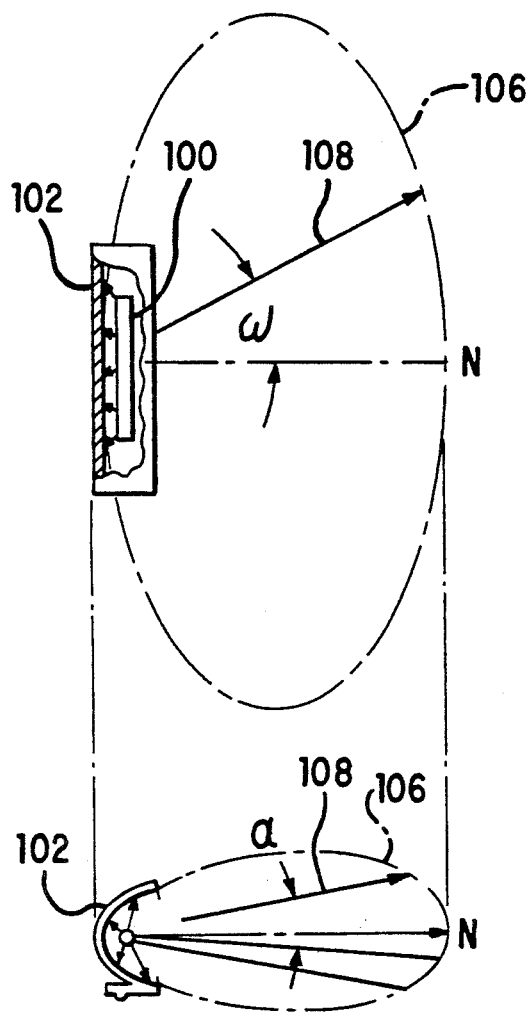
FIG. 2 illustrates top and side views of the light beam pattern generated with the reflector and linear light source illustrated in FIG. 1.

With reference to FIG. 2, which provides top and side views of lobe 106, it can be seen that the lobe shape is defined by a quasi-cosine function relative to a true Lambertian distribution where:

$$A = N \cos^5 \theta \qquad (1)$$

With continued reference to FIG. 2, the angle $\omega$ describes the angle in the horizontal dimension at which vector 108 is directed, and angle defines the direction of vector 108 in the vertical dimension. The direct energy received from light source 100 at any arbitrary distance from the reflector is relatively little compared to the energy re-radiated by reflector 102 and received at that same distance.

Figure 3:
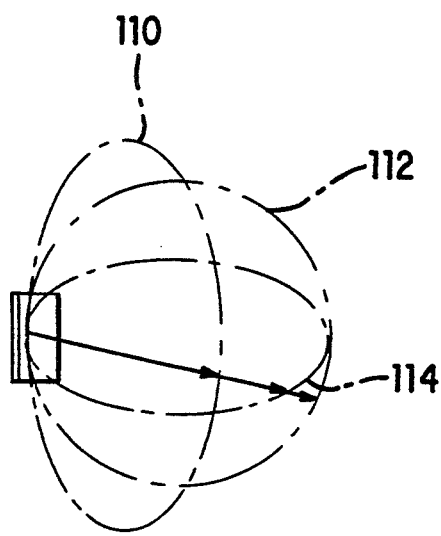
FIG. 3 illustrates varying types of beam distribution patterns achievable using a linear light source and parabolic reflector.

With reference to FIG. 3, there are illustrated different distributions or patterns of lobe 106 varying from a wide beam distribution 110 to a Lambertian or spherical distribution 112 arc then to a narrow beam distribution 114. The varying widths of these lobe patterns are defined by the length of the linear light source. Shorter linear light sources provide a narrower beam pattern, while longer linear light sources produce a wider beam pattern.

Figure 10:
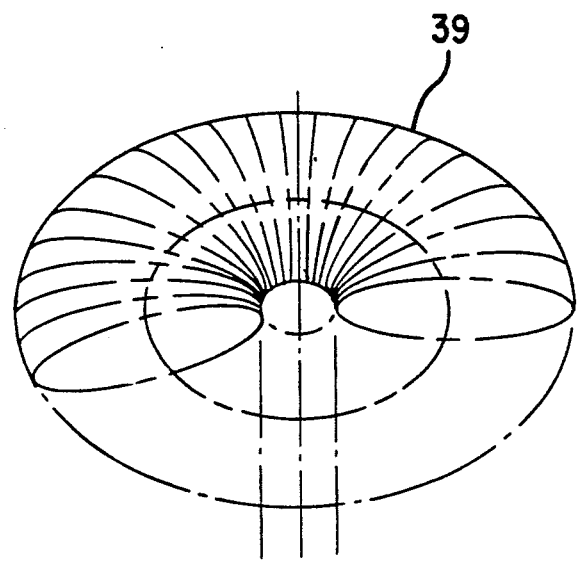
FIG. 10 is a diagrammatic representation of the toroidally shaped light beam capable of being closely approximated by the present invention and extending through a complete 360° arc.

The present invention utilizes multiple pairs of substantially horizontally disposed linear light sources and associated reflectors disposed relative to one another such that the lobes generated by each combine to approximate a 360° toroidal pattern of the type generally as illustrated in FIG. 10 and as described below with reference to the preferred embodiment of the present invention.

Figure 4:
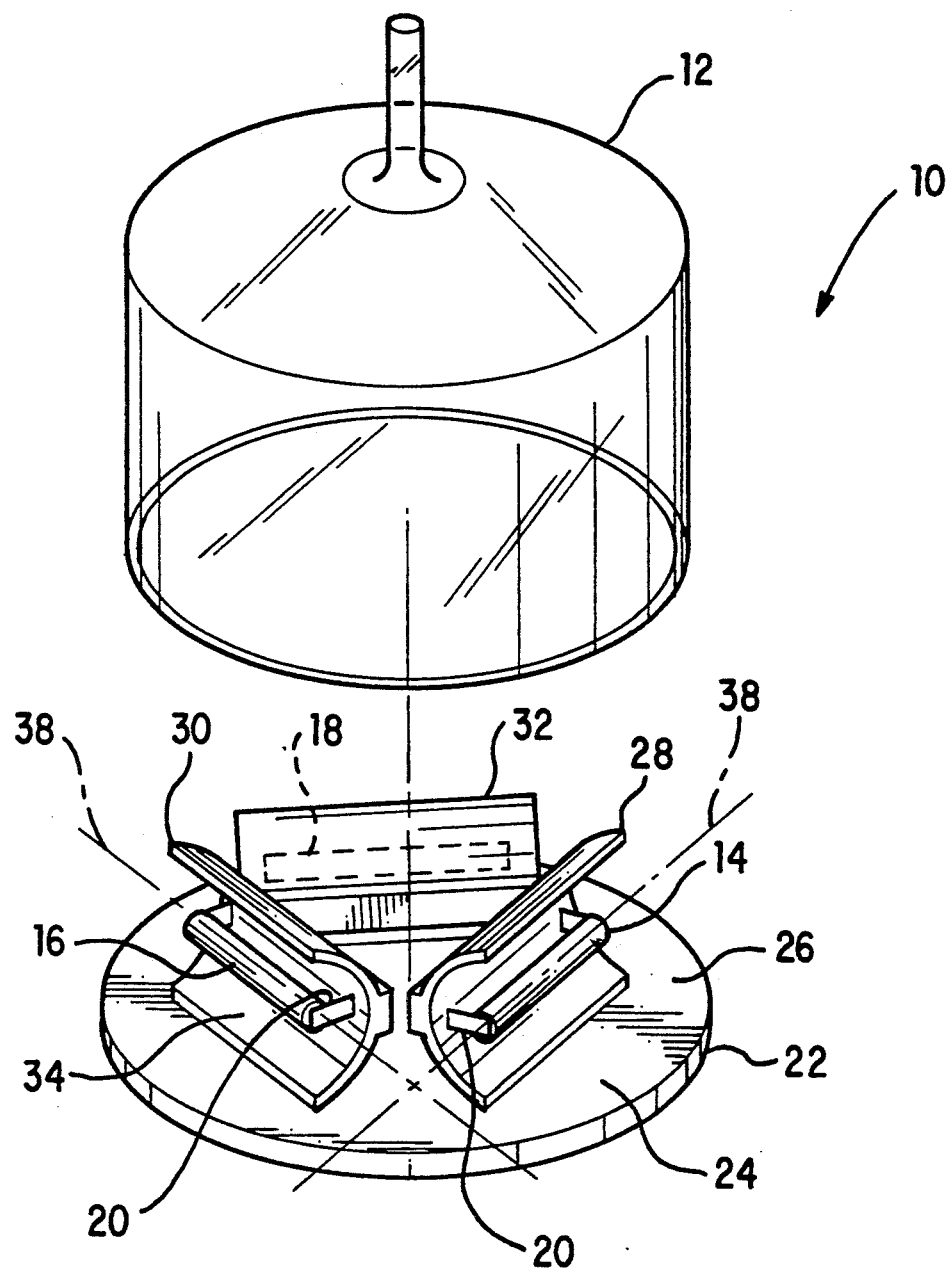
FIG. 4 illustrates an isometric view of a light beacon incorporating the teachings of the present invention and having three corresponding pairs of linear light sources and reflectors positioned at 120° relative one another.

With reference to FIG. 4, there is illustrated an isometric view of a light beacon 10 incorporating a preferred embodiment of the present invention. Light beacon 10 comprises a transparent cover 12 and a plurality of linear light sources. In the preferred embodiment shown, the plurality of linear light sources comprise cylindrical flash tubes 14, 16, and 18 as illustrated best in the top view of light beacon 10 shown in FIG. 5. Flash tubes 14, 16, and 18 may be filled with xenon or some other gas which generates light when charged.

Light beacon 10 includes a mechanism for positioning the linear light sources within the transparent cover in a substantially horizontal orientation relative to a reference plane. As embodied herein, the positioning mechanism comprises pairs of spaced posts 20 between which respective ones of linear light sources 14, 16, and 18 may positioned and held. Posts 20 may be fixed to and extend from respective ones of reflectors 28, 30, and 32, described in detail below, by counter bores and screws. Alternatively, posts 20 may be fixed to and extend from any convenient structure of beacon 10. Electrical power may be supplied to flash tubes 14, 16, and 18 via hard wired circuitry terminating at the distal ends of posts 20.

In the preferred embodiment illustrated in FIG. 4, reference plane 24 is defined by a top surface 26 of a base plate 22. However, the reference plane need not be defined in all instances by a top surface of the base plate, since in certain embodiments of the present invention the light beacon may not include a base plate per se, and alternative integral structures may be used. Thus, while reference plane 24 need not be defined by any particular structure of light beacon 10, it will normally be parallel to the horizon as viewed from the apex of the tall obstruction on which beacon 10 is mounted.

As noted above, light beacon 10 includes a plurality of reflectors 28, 30, and 32 which correspond to respective ones of light sources 14, 16, and 18. Each of reflectors 28, 30, and 32 include an optically reflective surface 34 which reflects light emitted by light sources 14, 16, and 18. As illustrated, the reflectors may be configured as partial cylinders having a parabolic or pseudo-parabolic cross-section. Reflective surface 34 or each reflector 28, 30, and 32 defines an optical center 38 which in FIG. 4 comprises a line parallel to surface 34.

Figure 5:
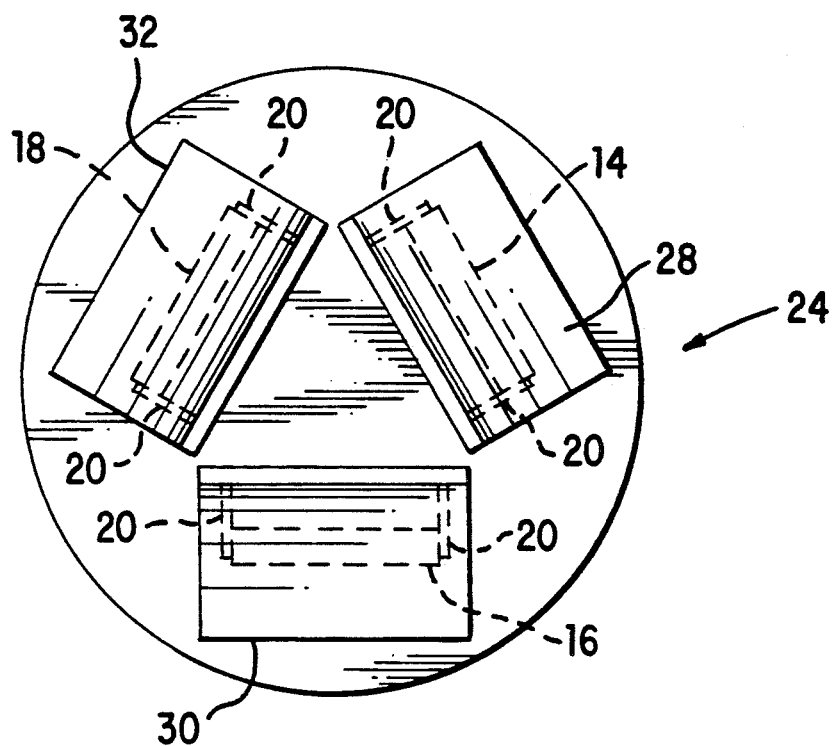
FIG. 5 is a top view of the embodiment of the invention illustrated in FIG. 4.

With reference to FIG. 5, posts 20, comprising in the preferred embodiment a mechanism for positioning the light sources within the cover, may be made of Teflon ® or ceramic and extend outwardly from the central portion of a respective reflector and are spaced apart by a distance just less than the length of the particular linear light source used such that posts 20 deflect slightly when the linear light source is placed therebetween and apply a spring bias force against opposite ends of the light source to hold it in place. Alternatively, the light source may have prongs on each end which fit into recesses on the posts. Posts 20 may be fixed to reflectors 14, 16, and 18 by screws (not shown) extending through the reflectors from the convex side. In a preferred embodiment of the invention, the reflectors have a length of 6.5 inches and posts 20 are mounted 0.5 to 0.75 inches inwardly from respective ends of the reflector. The flash tube would thus have a length dimension of 5.0 to 5.5 inches and a flash tube arc of about 2.5 to 3.0 inches. Posts 20 are dimensioned so as to position the central axis of linear light sources 14, 16, and 18 substantially coincident with optical center 38 of the corresponding reflector. In this manner, the illumination of the light sources is most efficiently re-radiated by reflective surfaces 34.

Figure 7:
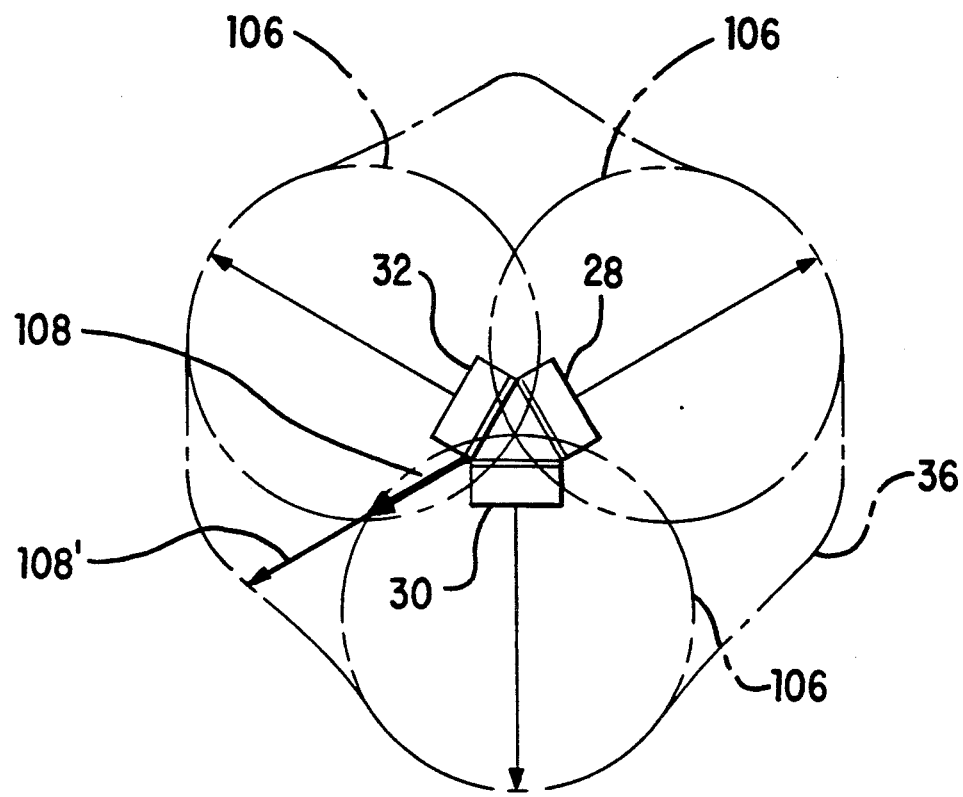
FIG. 7 is a diagrammatic illustration of the composite resultant light beam generated when all three of the light sources of the beacon illustrated in FIG. 4 are activated.

Beacon 10 includes a mechanism for mounting the reflectors within transparent cover 12 with each light source being positioned between the reflective surface of a corresponding reflector and the transparent cover. As embodied herein, and with reference to FIG. 8 which illustrates a representative one of the reflectors, the mechanism for mounting the reflectors comprises a flange portion 35 which extends rearwardly from the bottom edge 52 of each reflector 28, 30, and 32, and screws 37 which extend through bore holes tapped or drilled through flange 35 and base plate 22. Any number of screws 37 may be used to mount the respective reflectors.

Where three pairs of linear light sources and corresponding reflectors are utilized, as in the preferred embodiment illustrated in FIGS. 4 and 5, each light source and corresponding reflector is preferably positioned at an angle of 120° relative to its adjacent sets of light sources and reflectors. In this manner, and as illustrated in FIG. 7, the individual lobes 106 generated by respective ones of the light source and reflector pairs combine to form a composite resultant beam distribution which approximates a generally toroidal configuration 36 which extends a full 360° in a horizontal plane. Where the lobe 106 generated by each of the light source and reflector pairs overlaps the lobe 106 generated by the adjacent pairs of light sources and reflectors, the vectors 108 contributed by each light source forms a resultant combined vector 108' having an intensity equal to the sum of the individual vectors 108 generated by each light source and reflector pair.

As can be seen in FIG. 7, where only three pairs of light sources and reflectors are included in beacon 10 and arranged at approximately 120° angles relative to one another, the composite beam or lobe formed when each of the light sources is activated begins to approximate a 360° toroidal lobe. However, the present invention is not limited to only three pairs of light sources and reflectors. If additional sets of light sources and reflectors are added and are equally spaced relative one another within beacon 10, the composite lobe 36 will begin to more closely approximate a pure toroid 39 as best illustrated in FIG. 10. Thus, light beacons incorporating the present invention may comprise any number of corresponding pairs of light sources and reflectors from three up. In this manner, the light beacon according to the present invention has its respective sets of light sources and reflectors disposed relative to one another so as to generate a composite resultant light beam or lobe capable of providing a substantially uniform intensity over an arc of up to 360° when all the light sources are activated. Furthermore, since the linear light sources and reflectors are mounted horizontally, the height of cover 12 may be relatively small, thereby reducing wind loading.

Reflectors 28, 30, and 32 may have a parabolic cross-section or even a pseudo-parabolic cross-section. As used herein, pseudoparabolic refers to special cases of a parabolic curve such as an ellipsoid or a semicircle, or portions thereof, as well as complex surfaces comprising portions of parabolas defined by different parameters within the parabolic equation. Furthermore, it is envisioned that the cross-section of the reflectors may be aspheric. By appropriately defining the configuration of the reflective surface 34 of each reflector, the shape and configuration of the lobes generated by reflection of light from that surface can be of unlimited variety. The ability to vary the geometry of the light beam generated might be particularly useful where the landscape around the particular tall obstruction to which the beacon is mounted presents near distance interference which might block a portion of the beam.

Furthermore, the beacon of the present invention offers great flexibility in generating a composite light beam pattern or lobe having an arc of less than 360°. This desirable feature of the present invention is attained by providing in combination with a power supply for activating the linear light sources, a control circuit controlling the power supply to selectively activate and deactivate respective ones of the linear light sources in a given sequence.

Figure 11:
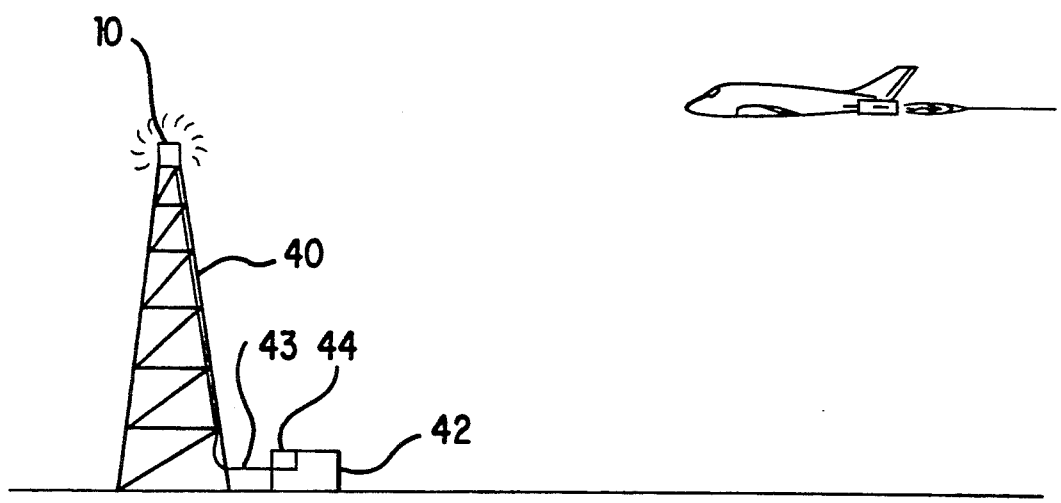
FIG. 11 is an illustration of a light beacon of the present invention mounted on an antenna tower.

With reference to FIG. 11, an antenna tower 40 has beacon 10 fixedly mounted at its apex. Since beacon 10 is capable of generating a light beam having a 360° arc, there is no requirement for mechanical apparatus to rotate the beacon as is common in some prior art obstruction lights. A power source 42 is conveniently located near the base of tower 40 to provide easy access for maintenance and includes any necessary components such as voltage transformers, relays, interlocks, surge arrestor, storage capacitors, etc. Power source 42 may be connected to beacon 10 by cable 43 and is itself connected to an external power source (not shown) by any suitable means. By way of example and not limitation, a power supply useful with beacons of the present invention is sold by EG&G Electro-Optics Division, 35 Congress Street, Salem, Massachusetts, under the designation SS-128 or SS-130 Power Supply.

The control circuit may conveniently comprise a controller 44 consisting of function embedded printed circuit cards disposed within the chassis of power supply 42. By way of example and not limitation, a controller suitable for use with the beacon of the present invention to provide flash intensity mode control signal and a "trigger" control signal is sold by EG&G Electro-Optics under the designation SS-122 Controller.

The power supply and circuit for controlling the power supply of the present invention is in no way limited by the capabilities and structure of the above-noted commercially available power supplies and controllers, and such power supplies and Controllers having differing outputs or hard-wired circuitry and differing control functions may also be used. In fact, the flexibility of the present invention attained by utilizing discrete segments or sets of light sources and corresponding reflectors provides the ability to design into a control circuit many other functions which are not available with prior art obstruction beacon lights. For instance, the controller may be programmed to activate all or certain ones of the light sources in a specified sequence to clearly identify the particular obstruction.

Figure 6:
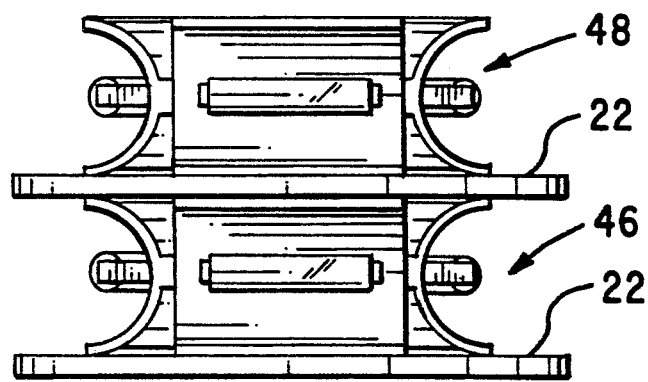
FIG. 6 is a side view of an additional embodiment of the present invention having stacked groups of corresponding light sources and reflectors.

Furthermore, the beacon of the present invention may also include first and second groups of corresponding pairs of light sources and reflectors as illustrated in FIG. 6. The first group 46 being disposed at a first height and a second group 48 being disposed at a second height above base plate 22. The associated power supply means and control means may be used to selectively activate the first group of corresponding pairs of light sources and reflectors during the daytime, for instance, while activating the second group at night. Moreover, the first and second groups of light sources and reflectors may be configured to generate different colors of light, for instance, white light during the day and red light at night. Such variations in color may be achievable by appropriate selection of cover 12.

Figure 8:
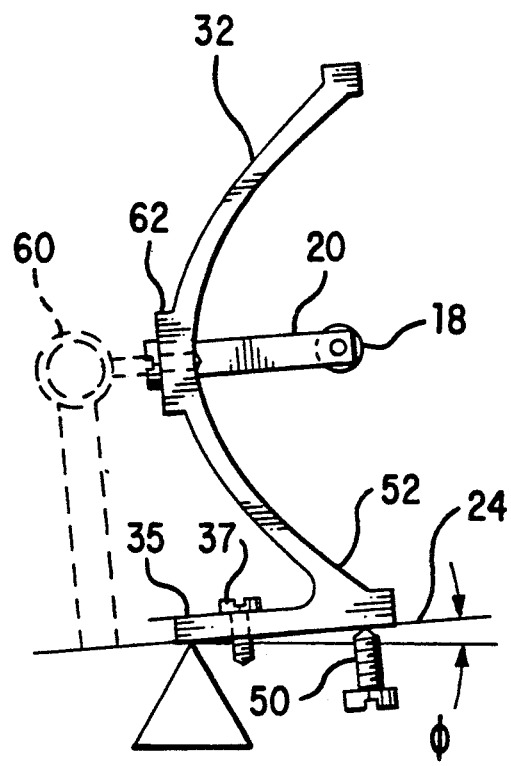
FIG. 8 is a side view of a representative reflector illustrating use of a set screw to adjust the orientation of the reflector about a first axis.

In certain applications where the terrain surrounding the tall obstruction which is to be lighted by the beacon presents obstacles which may block portions of the generated light beam, it may be desirable to adjust the orientation, e.g., the direction, of the generated beam either vertically or horizontally relative to the reference plane. To meet such requirements, the present invention includes a mechanism for adjusting the orientation of the linear light sources and reflectors relative to reference plane 24 to thereby adjust the shape and direction of the light beam generated. As embodied herein, and with reference to FIGS. 8, 8A, 9, and 9A, the adjusting mechanism includes at least one set screw 50 disposed below flange portion 35 of reflector 32 for adjusting the vertical orientation of the reflector and linear light source through an angle in the vertical dimension as illustrated in FIG. 8. While only one reflector is shown in FIGS. 8 and 9 for purposes of example, additional set screws 50 may be used to adjust all or some of the remaining reflectors. Set screw 50 may be conveniently mounted through a bore hole in base plate 22 or in any other convenient mounting structure within the beacon. Where such set screws are used to adjust the orientation of the reflectors, the mechanism for mounting the reflectors, which in the preferred embodiment comprises screws 37 extending through flange 35 and base plate 22, must be adapted to permit such adjustment. This adaptation may comprise use of a flexible grommet disposed between the screw 37 and flange 35 which can be compressed and expanded as the orientation of the reflector is adjusted. Other such adaptations will be known to those skilled in the art.

Figure 8A:
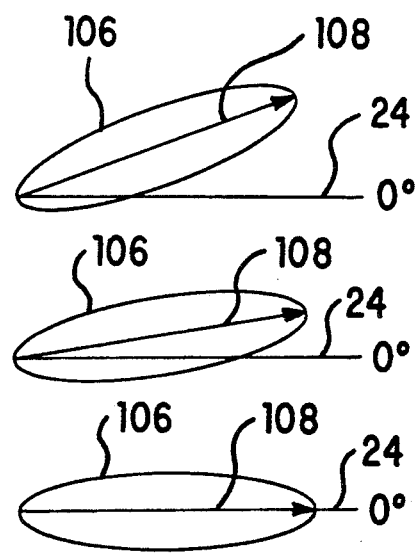
FIG. 8A illustrates variations in the direction of the light beam made by adjusting the set screw of FIG. 8.
Figure 9:
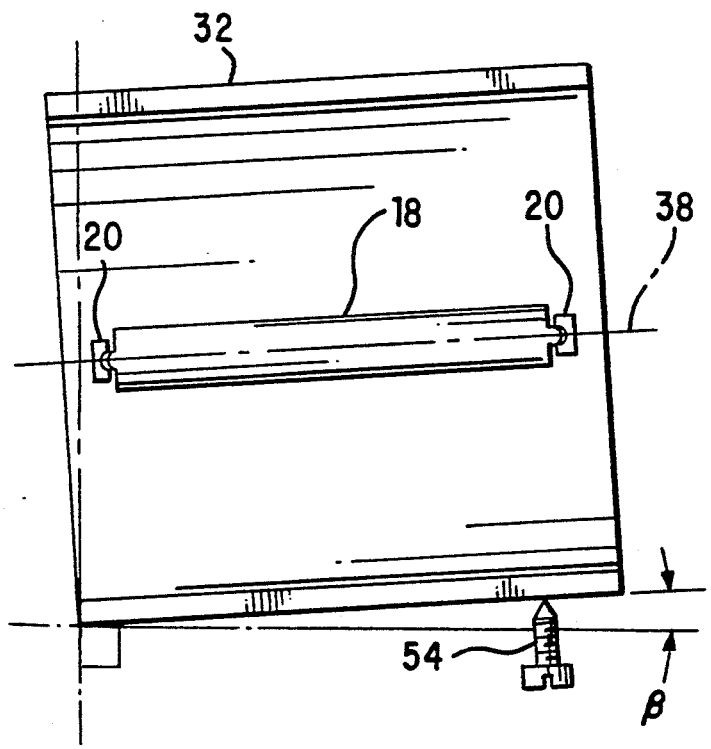
FIG. 9 is a front view of a representative reflector illustrating the use of a set screw to adjust the orientation of the reflector about a second axis.

With reference to FIG. 8A, as set screw 50 is inserted upwardly relative to base plate 22, the individual reflector, in this instance reflector 32, is oriented so as to direct the generated light beam represented by lobe 106 at a progressively greater angle relative to reference plane 24.

Figure 9A:
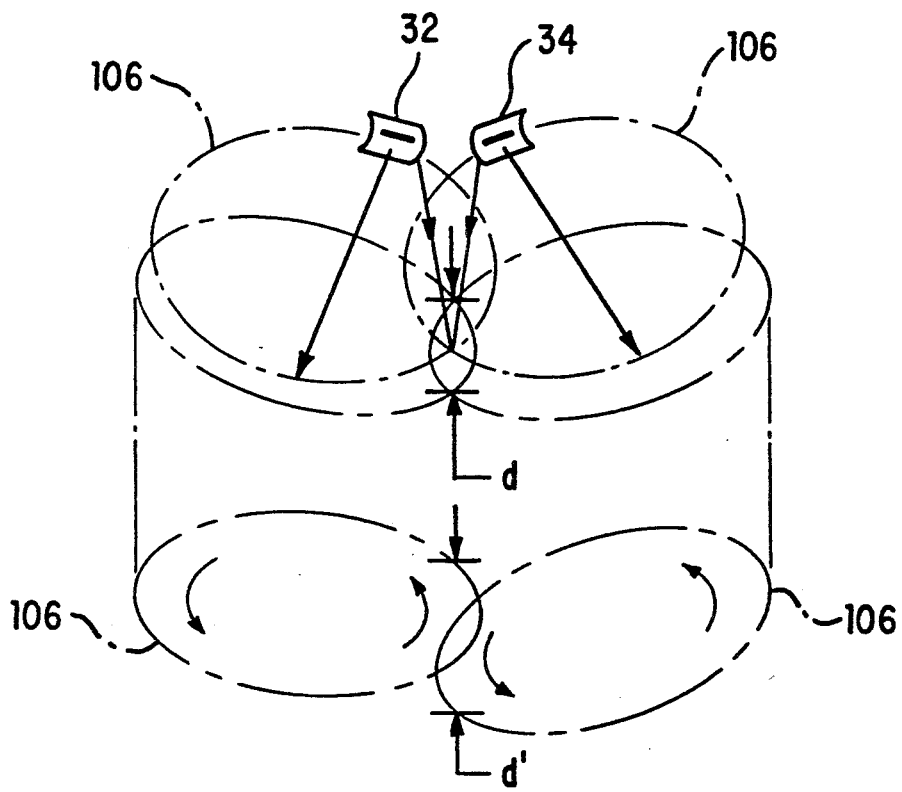
FIG. 9A illustrates variations in the spread of the light beam made by adjusting the setscrews of FIG. 9.

With reference to FIGS. 9 and 9A, reflector 32 may also have its orientation adjusted by rotation, e.g., tilting, about a second axis in the horizontal dimension by means of a further set screw 54 which extends through base plate 22. Insertion and withdrawal of set screw 54 through base plate 22 acts to tilt reflector 32 to thereby adjust the spread of the light beam generated by the beacon. This adjustment is illustrated in FIG. 9A. Two exemplary reflectors 32 and 34, disposed at 120° angles relative to one another, each generate lobes 106 which at their overlapping portion have a beam width "d" at some arbitrarily defined distance from the reflectors. By tilting reflectors 32 and 34 in opposite directions through appropriate manipulation of respective set screws 54, the beam spread at the overlapping point of lobes 106 becomes a width "d," which is larger than width "d." Where three corresponding pairs of light sources and reflectors are disposed at 120° angles relative to one another, the increased beam spread "d," will occur at 60° intervals in a 360° arc about reference plane 24. Of course, where larger numbers of reflector and light source pairs are used in a beacon in accordance with the present invention, the beam spread "d," will occur at successively greater numbers of points about a 360° arc.

An alternative embodiment of the mechanism for adjusting the orientation of the light sources and reflectors relative to the reference plane is illustrated in ghost lines in FIG. 8 and comprises a ball and socket type of pivotable joint 60 which is fixedly attached to a central portion 62 of reflector 32. Ball and socket joint 60 permits rotation of reflector 32 about at least two orthogonally aligned axes to thereby adjust the orientation of the reflector relative to reference plane 24 to achieve the same types of adjustments of the direction of the generated light beam as are illustrated in FIGS. 8A and 9A.

Other types of structures may also be used for adjusting the orientation of the reflectors and light sources relative to reference plane 24. For example, cam surfaces and associated runners may be mounted on the base plate and configured on flange portion 35 of reflector 32 to thereby selectively adjust the orientation of the reflector 32 and its associated light source relative to reference plane 24. Thus, the particular examples of the mechanism for adjusting the orientation of the reflectors as described above is not limitive of the scope of the present invention and is provided only by way of example.

Furthermore, additional advantages and modifications to the preferred embodiments of the present invention described above will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claim and their equivalents.

What is claimed is:

1. A light beacon, comprising:
   a transparent cover;
   a plurality of linear light sources, each having a central axis;
   means for positioning said linear light sources within said transparent cover in a substantially horizontal orientation relative to a reference plane;
   a plurality of reflectors corresponding to said plurality of linear light sources, each said reflector having an optically reflective surface;
   means for mounting said reflectors within said transparent cover with each light source being positioned between the reflective surface of a corresponding reflector and the transparent cover;
   said linear light sources and said reflectors being disposed relative to one another to generate a light beam having substantially uniform intensity over an arc of up to 360°; and
   means for adjusting the orientation of said linear light sources and reflectors relative to said reference plane to adjust the shape and direction of the light beam generated.

2. The light beacon of claim 1, wherein each said reflective surface has an optical center, and said means for positioning said linear light sources includes means for mounting said linear light sources with the central axis of each light source being substantially coincident with the optical center of the corresponding reflector.

3. The light beacon of claim 2, wherein said means for positioning said linear light sources include a pair of spaced posts extending from each said reflector and adapted to mount and hold the respective linear light source therebetween.

4. The light beacon of claim 1, wherein said reflectors each have a parabolic cross-section.

5. The light beacon of claim 1, wherein said reflectors each have a pseudo-parabolic cross-section.

6. The light beacon of claim 1, wherein said linear light sources each comprise a tube having a linear central axis.

7. The light beacon of claim 1, including power supply means for activating said linear light sources to produce light.

8. The light beacon of claim 7, including means for controlling said power supply means to selectively activate respective ones of said linear light sources in a selected sequence.

9. The light beacon of claim 1, wherein said linear light sources and reflectors comprise three corresponding pairs of light sources and reflectors disposed at about 120° angles relative to one another.

10. A light beacon, comprising:
    a transparent cover;
    a plurality of linear light sources, each having a central axis;
    means for positioning said linear light sources within said transparent cover in a substantially horizontal orientation relative to a reference plane;
    a plurality of reflectors corresponding to said plurality of linear light sources, each said reflector having an optically reflective surface;
    means for mounting said reflectors within said transparent cover with each light source being positioned between the reflective surface of a corresponding reflector and the transparent cover;
    said linear light sources and said reflectors being disposed relative to one another to generate a light beam having substantially uniform intensity over an arc of up to 360°; and
    a base plate having a surface which defines said reference plane, and wherein said linear light sources and reflectors comprise at least first and second groups of corresponding pairs of light sources and reflectors, said first group being disposed at a first height above said base plate and said second group being disposed at a second height above said base plate.

11. The light beacon of claim 10, including power supply means for activating said linear light sources to produce light, and means for controlling said power supply means to selectively activate said first and second groups of light sources and reflectors.

12. The light beacon of claim 11, wherein said first and second groups of light sources and reflectors produce different colorlight.

13. A light beacon, comprising:
    a transparent cover;
    a plurality of linear light sources, each having a central axis;
    means for positioning said linear light sources within said transparent cover in a substantially horizontal orientation relative to a reference plane;
    a plurality of reflectors corresponding to said plurality of linear light sources, each said reflector having an optically reflective surface;
    means for mounting said reflectors within said transparent cover with each light source being positioned between the reflective surface of a corresponding reflector and the transparent cover; and
    said linear light sources and said reflectors being disposed relative to one another to generate a light beam having substantially uniform intensity over an arc of up to 360°,
    means includes means for adjusting said reflectors in at least two degrees of freedom relative to said reference plane to thereby adjust the shape of the light beam generated by the light sources and reflectors.

14. The light beacon of claim 13, wherein said adjusting means includes a plurality of set screws for adjusting the orientation of said reflectors relative to said reference plane.

15. A light beacon, comprising:
    a transparent cover;
    a plurality of linear light sources, each having a central axis;

means for positioning said linear light sources within said transparent cover in a substantially horizontal orientation relative to a reference plane;

a plurality of reflectors corresponding to said plurality of linear light sources, each said reflector having an optically reflective surface;

means for mounting said reflectors within said transparent cover with each light source being positioned between the reflective surface of a corresponding reflector and the transparent cover; and said linear light sources and said reflectors being disposed relative to one another to generate a light beam having substantially uniform intensity over an arc of up to 360°, wherein said means for mounting said reflectors includes means for pivotally mounting said reflectors relative to said reference plane.

16. A system for marking tall obstructions, comprising:

light beacon means for being fixedly attached near the apex of a tall obstruction;

power supply means for activating said light beacon means, said light beacon means comprising:

a base plate having a surface which defines a plane;

a transparent cover;

a plurality of linear light sources;

means for mounting said linear light sources in a substantially horizontal orientation relative to said plane defined by the surface of said base plate;

a plurality of reflectors corresponding to said plurality of linear light sources, each said reflector having an optically reflective surface;

means for mounting said reflectors within said transparent cover with each light source being positioned between the reflective surface of a corresponding reflector and the transparent cover;

said linear light sources and said reflectors being disposed relative to one another to generate a light beam having substantially uniform intensity over an arc of up to 360°; and means for adjusting the orientation of said linear light sources and reflectors relative to said plane defined by the surface of said base plate.

17. The light beacon of claim 16, wherein said reflectors each have a parabolic cross-section.

18. The light beacon of claim 16, wherein said reflectors each have a pseudo-parabolic cross-section.

19. The light beacon of claim 16, including means for controlling said power supply means to selectively activate respective ones of said linear light sources in a selective sequence.

20. A light beacon, comprising:

a transparent cover;

a plurality of linear light sources, each having a central axis;

a mechanism positioning said linear light sources within said transparent cover in a substantially horizontal orientation relative to a reference plane;

a plurality of reflectors corresponding to said plurality of linear light sources, each said reflector having an optically reflective surface;

a mechanism mounting said reflectors within said transparent cover with each light source being positioned between the reflective surface of a corresponding reflector and the transparent cover;

said linear light sources and said reflectors being disposed relative to one another to generate a light beam having substantially uniform intensity over an arc of up to 360°; and a mechanism for adjusting the orientation of said linear light sources and reflectors relative to said reference plane to adjust the shape and direction of the light beam generated.

21. The light beacon of claim 20, wherein each said reflective surface defines an optical center, and said linear light sources are disposed with the central axis of each light source being substantially coincident with the optical center of the corresponding reflector.

22. The light beacon of claim 20, wherein said mechanism positioning said linear light sources within the cover includes a pair of spaced posts extending from each said reflector and adapted to mount and hold the respective linear light source therebetween.

23. The light beacon of claim 1, wherein said reflectors each have a parabolic cross-section.

24. The light beacon of claim 23, including a power supply for activating said linear light sources to produce light.

25. The light beacon of claim 27, including a controller to selectively activate respective ones of said linear light sources in a selected sequence.

26. The light beacon of claim 23, wherein said linear light sources and reflectors comprise three corresponding pairs of light sources and reflectors disposed at about 120° angles relative to one another.

* * * * *

UNITED STATES PATENT AND TRADEMARK OFFICE
CERTIFICATE OF CORRECTION

PATENT NO. : 5,155,666

DATED : October 13, 1992

INVENTOR(S) : Ray A. Radford and Robert A. Capobianco

It is certified that error appears in the above-identified patent and that said Letters Patent is hereby corrected as shown below:

Claim 12, column 10, line 37, change "colorlight" to --color light--.

Claim 13, column 10, line 56, before "means" (first occurrence) insert --wherein said mounting--.

Claim 19, column 12, line 4, change "selective" to --selected--.

Claim 23, column 12, line 37, change "1" to --20--.

Claim 24, column 12, line 39, change "23" to --20--.

Claim 25, column 12, line 42, change "27" to --24--.

Claim 26, column 12, line 45, change "23" to --20--.

Abstract, line 22, before "beam" insert --light--.

Signed and Sealed this

Tenth Day of May, 1994

Attest:

BRUCE LEHMAN

Attesting Officer

Commissioner of Patents and Trademarks